US012802677B2

(12) United States Patent
Sagata

(10) Patent No.: US 12,802,677 B2
(45) Date of Patent: Nov. 17, 2026

(54) INFORMATION PROCESSING DEVICE FOR SOUND CANCELLATION

(71) Applicant: TOYOTA JIDOSHA KABUSHIKI KAISHA, Aichi-ken (JP)

(72) Inventor: Koji Sagata, Nagakute (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 259 days.

(21) Appl. No.: 18/887,036

(22) Filed: Sep. 17, 2024

(65) Prior Publication Data

US 2025/0104686 A1 Mar. 27, 2025

(30) Foreign Application Priority Data

Sep. 25, 2023 (JP) ................................ 2023-161675

(51) Int. Cl.
*G10K 11/178* (2006.01)

(52) U.S. Cl.
CPC .. *G10K 11/17823* (2018.01); *G10K 11/17881* (2018.01)

(58) Field of Classification Search
CPC ....... G10K 11/17823; G10K 11/17881; G10K 2210/505; G10K 2021/02082; H04R 2499/13; G10L 21/02; G10L 21/0208
See application file for complete search history.

(56) References Cited

U.S. PATENT DOCUMENTS

2017/0116983 A1* 4/2017 Furukawa ............... G10L 15/20
2020/0288239 A1* 9/2020 Yuzuriha .................. H04R 5/04

FOREIGN PATENT DOCUMENTS

JP 2009-181025 A 8/2009

* cited by examiner

*Primary Examiner* — James K Mooney

(74) *Attorney, Agent, or Firm* — HAUPTMAN HAM, LLP

(57) ABSTRACT

The control unit of the information processing device acquires a plurality of first sounds output from a plurality of speakers. The control unit of the information processing device calculates a ratio of magnitudes of the plurality of acquired first sounds. Then, the control unit sets the mixing ratio by applying the calculated ratio of the magnitudes of the plurality of first sounds as a mixing ratio that is a ratio at which the plurality of sound signals is mixed, and as a mixing ratio used to generate a reference signal for canceling the plurality of output sounds output from the plurality of speakers in response to the plurality of sound signals from the sound acquired from the microphone.

5 Claims, 4 Drawing Sheets

PERCENTAGE INFORMATION

| GROUPING ID | SPEAKER ID | RATIO |
|---|---|---|
| *** | *** | *** |
| | ⋮ | ⋮ |
| | *** | *** |
| ⋮ | ⋮ | ⋮ |

1

INFORMATION PROCESSING DEVICE FOR SOUND CANCELLATION

CROSS-REFERENCE TO RELATED APPLICATION

This application claims priority to Japanese Patent Application No. 2023-161675 filed on Sep. 25, 2023, incorporated herein by reference in its entirety.

BACKGROUND

1. Technical Field

The present disclosure relates to an information processing device.

2. Description of Related Art

Japanese Unexamined Patent Application Publication No. 2009-181025 (JP 2009-181025 A) discloses an in-vehicle speech recognition device that performs an echo cancellation process for removing echo components included in input speech. The in-vehicle speech recognition device disclosed in JP 2009-181025 A removes echo components included in input speech collected via a microphone and signals from a plurality of sound sources. In addition, the in-vehicle speech recognition device performs speech recognition on the output from which the echo components have been removed. In addition, the in-vehicle speech recognition device monitors input speech collected via a microphone and signals from a plurality of sound sources, determines whether the speech recognition rate is improved by removing the echo components, and controls an echo cancellation process.

SUMMARY

An object of the present disclosure is to effectively cancel out a plurality of sounds output from a plurality of speakers.

An aspect of the present disclosure provides an information processing device including a control unit configured to: acquire a plurality of first sounds output from a plurality of speakers; calculate proportions of magnitudes of the acquired first sounds; and set mixing proportions by applying the calculated proportions of the magnitudes of the first sounds as the mixing proportions, the mixing proportions being proportions for mixing a plurality of sound signals and being used to generate a reference signal for canceling out a plurality of output sounds output from the speakers according to the sound signals from a sound acquired from a microphone.

According to the present disclosure, it is possible to effectively cancel out a plurality of sounds output from a plurality of speakers.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Assume that sound is acquired by a microphone. At this time, a speaker existing around the microphone may be outputting sound. Then, the sound output from the speaker is mixed with the sound acquired from the microphone.

In addition, a plurality of speakers may output a plurality of sounds. At this time, the plurality of sounds may be cancelled out from the sound acquired from the microphone by using a reference signal for canceling the plurality of sounds output from the plurality of speakers. An object of the information processing device according to the present disclosure is to cancel a plurality of sounds output from a plurality of speakers in such a case.

The control unit of the information processing device according to the present disclosure acquires a plurality of first sounds output from a plurality of speakers. The control unit of the information processing device calculates a ratio of magnitudes of the plurality of acquired first sounds. Then, the control unit sets the mixing ratio by applying the calculated ratio of the magnitudes of the plurality of first sounds as the mixing ratio. Here, the mixing ratio is a ratio at which a plurality of sound signals is mixed, and is a ratio used for generating a reference signal for canceling a plurality of output sounds output from a plurality of speakers in response to a plurality of sound signals from sounds acquired from a microphone.

As described above, the mixing ratio is designated by the information processing device. As a result, mixing is performed according to the magnitude of the first sound output from each speaker, and a reference signal is generated. Then, the plurality of sounds output by the plurality of speakers from the sound acquired from the microphone are canceled by using the reference signal.

At this time, in the reference signal, a plurality of sound signals is mixed in accordance with the magnitude of the first sound. As a result, in the plurality of output sounds, mixing is performed at a larger rate in the reference signal as the output sound is larger. Therefore, among the plurality of output sounds, the output sound can be emphasized with respect to a sound having a large output sound. As a result, a plurality of sounds output from a plurality of speakers can be effectively cancelled out.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

Embodiment

Figure 1:
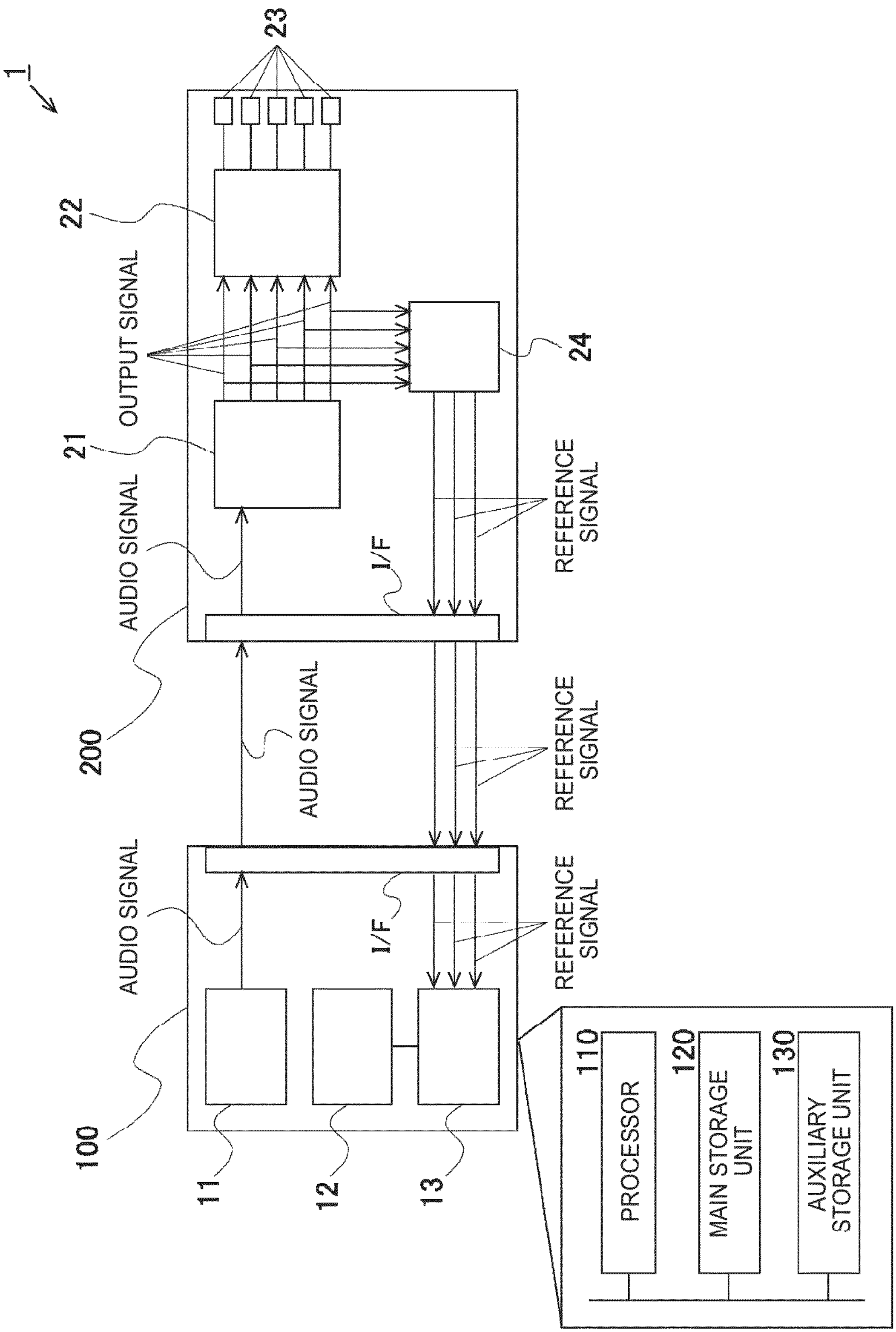
FIG. 1 is a diagram illustrating a schematic configuration of a speech recognition system according to the present embodiment.

The speech recognition system 1 according to the present embodiment will be described with reference to FIGS. 1 and 2. FIG. 1 is a diagram illustrating a schematic configuration of a speech recognition system 1 according to the present embodiment. The speech recognition system 1 includes an in-vehicle device 100 and an audio device 200. In the speech recognition system 1, the in-vehicle device 100 and the audio device 200 are connected to each other via an in-vehicle network via an interface (I/F).

In-Vehicle Device

The in-vehicle device 100 is a device mounted on the vehicle 10. The in-vehicle device 100 provides various services, such as provision of information, to the user in response to an utterance from a user riding on the vehicle 10. In addition, the in-vehicle device 100 outputs a signal for outputting a sound such as music or white noise in the vehicle 10. Specifically, the in-vehicle device 100 includes a source device 11, a microphone 12, and a canceller 13.

The source device 11 is a device that outputs an audio signal for causing the audio device 200 to reproduce a sound such as music. The source device 11 is, for example, a medium reading device such as a CD drive. The source device 11 reads a medium such as a CD and outputs an audio signal. The source device 11 is a device that outputs information such as music or white noise held in advance as an audio signal. The microphone 12 is a microphone mounted on the vehicle 10. The microphone 12 acquires an utterance from a user riding on the vehicle 10.

The canceller 13 is a device for canceling other sounds from the sounds including the utterance of the user, which are acquired by the microphone 12. Details of how the canceller 13 cancels the other sounds from the sounds including the user's utterance will be described later.

The in-vehicle device 100 includes a computer having a processor 110, a main storage unit 120, and an auxiliary storage unit 130. The processor 110 is, for example, Central Processing Unit (CPU) or Digital Signal Processor (DSP). The main storage unit 120 is, for example, a random access memory (RAM). The auxiliary storage unit 130 is, for example, a read only memory (ROM). The auxiliary storage unit 130 is, for example, a Hard Disk Drive (HDD), a CD-ROM, DVD disc, or a disc recording medium such as a Blu-ray disc. Further, the auxiliary storage unit 130 may be a removable medium (portable storage medium). Examples of the removable medium include a USB memory or an SD card.

In the in-vehicle device 100, an operating system (OS), various programs, various information tables, and the like are stored in the auxiliary storage unit 130. Further, in the in-vehicle device 100, the processor 110 loads the program stored in the auxiliary storage unit 130 into the main storage unit 120 and executes the program, thereby realizing various functions as described later. However, some or all of the functions of the in-vehicle device 100 may be realized by hardware circuitry such as ASIC or FPGA. Note that the in-vehicle device 100 does not necessarily have to be realized by a single physical configuration, and may be constituted by a plurality of computers that cooperate with each other.

Audio Device

The audio device 200 is a device mounted on the vehicle 10. The audio device 200 outputs a sound such as music using the audio signal received from the in-vehicle device 100. The audio device 200 includes a microcomputer 21, an amplifier 22, a plurality of speakers 23, and a mixer 24. Note that the audio device 200 includes a computer in the same manner as the in-vehicle device 100.

The microcomputer 21 is a device that converts an audio signal received from the vehicle 10 into an output signal for the audio device 200 (the speaker 23) to output sound. The microcomputer 21 transmits the output signal obtained by converting the audio signal to the amplifier 22. The amplifier 22 is a device that amplifies an output signal received from the vehicle 10 and outputs the amplified signal to the speaker 23. In the present embodiment, the output signal is a signal whose sound magnitude is designated by the voltage magnitude.

The speaker 23 is a speaker provided in the vehicle 10. The vehicle 10 is provided with a plurality of speakers 23. Then, the speaker 23 outputs sound into the vehicle 10 using the amplified output signal received from the amplifier 22. Here, the microcomputer 21 transmits output signals of a plurality of channels to the microcomputer 21 in order to cause the plurality of speakers 23 to output sound. Here, the number of output signals transmitted by the microcomputer 21 may coincide with the number of speakers 23, or may be a number smaller than the number of speakers 23. When the number of output signals is smaller than the number of speakers 23, at least two speakers 23 output sound using the same output signal.

At this time, the user of the vehicle 10 may utter the in-vehicle device 100 (microphone 12). In this case, it is assumed that sound such as music output by the speaker 23 is acquired by the microphone 12 together with the utterance of the vehicle 10. Then, the sound of the music or the like that the speaker 23 has outputted, the voice recognition for the voice of the user of the vehicle 10 by the in-vehicle device 100 may be inhibited.

Therefore, it is assumed that the audio device 200 transmits the output signal to the in-vehicle device 100, and the in-vehicle device 100 refers to the output signal and cancels the sound output from the audio device 200 (the speaker 23) from the sound acquired by the microphone 12. On the other hand, in the present embodiment, the in-vehicle device 100 and the audio device 200 are connected to each other by interfaces (I/F). At this time, the audio signal transmitted by the in-vehicle device 100 and the signal used to cancel the sound output from the audio device 200 (the speaker 23) are simultaneously transmitted and received between the in-vehicle device 100 and the audio device 200. Then, there is a case where a bandwidth for transmission and reception of a signal is insufficient. As described above, since all of the plurality of output signals cannot be transmitted to the in-vehicle device 100 due to insufficient bandwidth, it is necessary to mix at least a part of the output signals.

Figure 2:
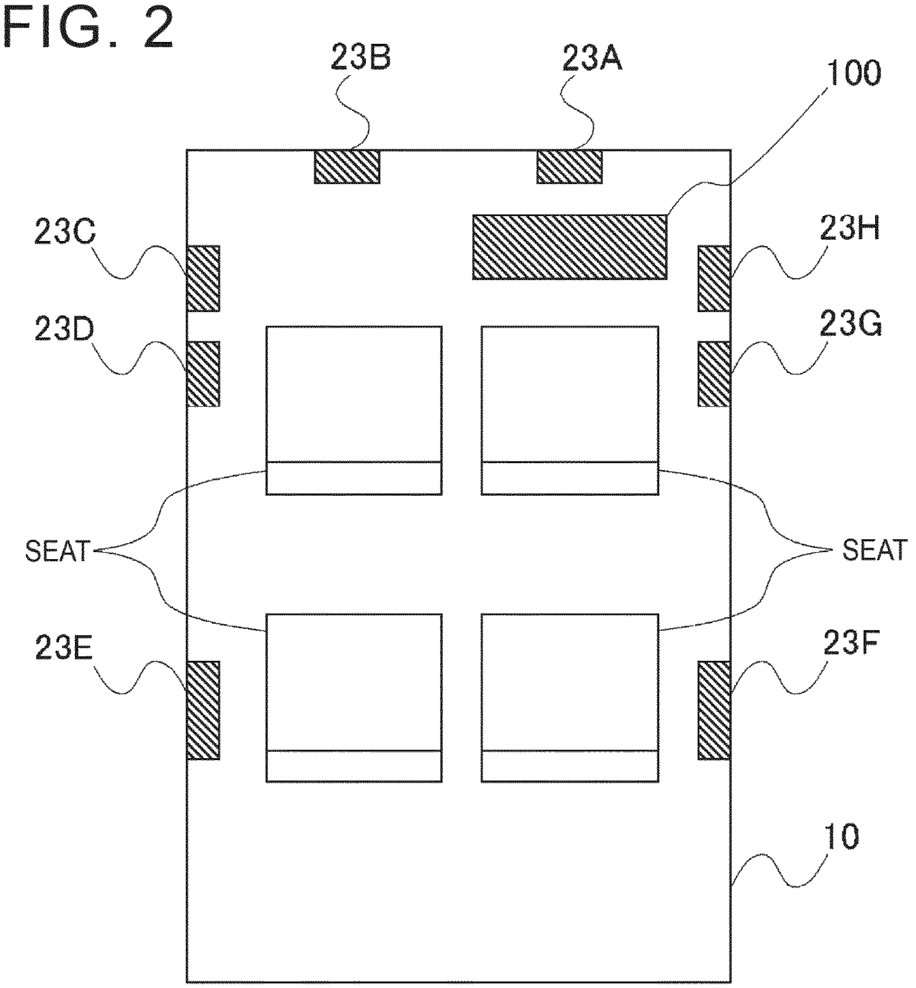
FIG. 2 is a diagram illustrating an arrangement of a plurality of speakers and an in-vehicle device in a vehicle.

FIG. 2 is a diagram illustrating the arrangement of the plurality of speakers 23 and the in-vehicle device 100 in the vehicle 10. As shown in FIG. 2, in the vehicle 10, eight speakers 23 (speaker 23A, speaker 23B, speaker 23C, speaker 23D, speaker 23E, speaker 23F, speaker 23G, and speaker 23H) is provided. In addition, in the vehicle 10, an in-vehicle device 100 is provided on the right front side of the vehicle 10. The in-vehicle device 100 is provided, for example, in front of a driver's seat of the vehicle 10.

At this time, the speaker 23C and the speaker 23D are provided at positions relatively closer to each other than the other speakers 23. Therefore, in the speaker 23C and the speaker 23D, the direction from the in-vehicle device 100 is similar to that of the other speakers 23. Further, in the speaker 23C and the speaker 23D, a difference in distance to the in-vehicle device 100 is smaller than a difference in distance between the other two speakers 23. Therefore, the positional relationship between the speaker 23C and the speaker 23D and the in-vehicle device 100 is similar to the positional relationship between the other speakers 23 and the in-vehicle device 100.

Therefore, it can be said that the state in which the sound output from the speaker 23C and the speaker 23D is reflected by the effect of a wall or the like before reaching the in-vehicle device 100 is more similar than the state in which the sound output from the other speakers 23 is reflected before reaching the in-vehicle device 100. Further, it can be said that the amount of attenuation of the sound output from the speaker 23C and the speaker 23D before reaching the in-vehicle device 100 is similar to the amount of attenuation of the sound output from the other speakers 23 before reaching the in-vehicle device 100. That is, it can be said that the sound outputted from the speaker 23C and the speaker 23D reaches the in-vehicle device 100 with a similar change to that of the other speakers 23. Therefore, in the present embodiment, the speaker 23C and the speaker 23D are treated as one grouping.

Further, in the drawing shown in FIG. 2, the speaker 23G and the speaker 23H are also provided at positions relatively close to those of the other speakers 23. Therefore, the speaker 23G and the speaker 23H can be handled as one grouping. Then, the mixer 24 mixes the output signal output to the speaker 23C and the speaker 23D and the output signal output to the speaker 23G and the speaker 23H as one signal. Thus, for example, the eight output signals can be six signals. In the present embodiment, two speakers 23 are set as one group, but two or more speakers 23 may be set as one group. As described above, the plurality of speakers 23 provided within a predetermined distance from each other are set as one group, and the output signals to the plurality of speakers 23 are mixed.

Then, the mixer 24 outputs a signal obtained by mixing the output signals (hereinafter, sometimes referred to as a "reference signal") to the in-vehicle device 100. The mixer 24 outputs the output signals of the other speakers 23 that do not belong to any group of the output signals to the in-vehicle device 100 as the reference signals without mixing with the other output signals. Specifically, the mixer 24 outputs a reference-signal to the canceller 13 via I/F. Thus, the canceller 13 can cancel the sound output from the speaker 23 by using the reference signal. The mixer 24 outputs a reference signal (output signal) to the in-vehicle device 100 in real time.

At this time, it is necessary to determine a ratio (hereinafter, sometimes referred to as "mixing ratio") at which the audio device 200 mixes the output signal. Therefore, the in-vehicle device 100 causes each speaker 23 belonging to one group to output white noise. In addition, the in-vehicle device 100 acquires the loudness (sound pressure, sound volume, or the like) of the white noise output from each speaker 23 using the microphone 12. The in-vehicle device 100 designates the ratio of the magnitude of the white noise output from each speaker 23 as the mixing ratio of the output signal to each speaker 23.

By determining the mixing ratio in this way, the sounds output from the plurality of speakers 23 belonging to one group are mixed in the reference signal in accordance with the loudness of the sound of the white noise. That is, in the sound output from the plurality of speakers 23 belonging to one group, the higher the loudness of the white noise sound is output from the speaker 23, the higher the mixing is performed in the reference signal. Therefore, among the sounds output by the plurality of speakers 23 belonging to one group, it is possible to place emphasis on sounds having a large sound volume. As a result, it is possible to effectively cancel out a plurality of sounds output from a plurality of speakers 23 belonging to one group. The sound output from the speaker 23 that does not belong to the group is also output as a reference signal without mixing. Accordingly, the sound output from the speaker 23 that does not belong to the group can also be cancelled out.

Functional Configuration

Figure 3:
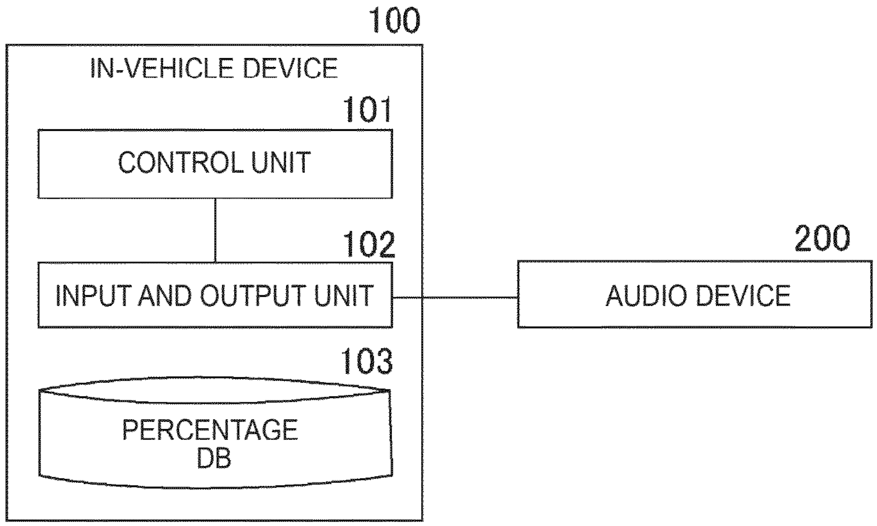
FIG. 3 is a block diagram schematically illustrating an example of a functional configuration of an in-vehicle device.

Next, a functional configuration of the in-vehicle device 100 constituting the speech recognition system 1 will be described with reference to FIGS. 3 and 4. FIG. 3 is a block diagram schematically illustrating an example of a functional configuration of the in-vehicle device 100.

The in-vehicle device 100 includes a control unit 101, an input/output unit 102, and a ratio information database 103 (ratio information DB 103). The control unit 101 has a function of performing arithmetic processing for controlling the in-vehicle device 100. The control unit 101 can be realized by the processor 110 in the in-vehicle device 100. The input/output unit 102 has a function of connecting the in-vehicle device 100 to the audio device 200 and inputting and outputting various signals. The input/output unit 102 can be realized by I/F in the in-vehicle device 100.

The control unit 101 outputs an audio signal to the audio device 200 via the input/output unit 102. Further, the control unit 101 outputs an audio signal for causing each speaker 23 to output white noise to the audio device 200 via the input/output unit 102. Specifically, the control unit 101 causes the source device 11 to output an audio signal. Here, the audio signal for outputting white noise includes a signal for designating the speaker 23 for outputting white noise. The control unit 101 outputs an audio signal for outputting white noise to a plurality of speakers 23 arranged in one group (in the example shown in FIG. 2, the speaker 23C and speaker 23D, as well as the speaker 23G and speaker 23H). Here, the control unit 101 sequentially outputs audio signals to the respective speakers 23 so that the plurality of speakers 23 grouped into one group do not simultaneously output white noise.

At this time, for example, the control unit 101 causes the plurality of speakers 23 grouped into one group to output white noise of the same size. In addition, in a case where the setting values are determined so that the loudness of sounds to be output to the respective speakers 23 is different with respect to the same audio signal, the control unit 101 causes sounds corresponding to the setting values to be output.

When the control unit 101 outputs an audio signal for outputting white noise, it acquires white noise output from each speaker 23 using the microphone 12. At this time, the control unit 101 acquires the loudness of the white noise, which is the white noise output from each speaker 23 and is acquired by the microphone 12 (hereinafter, may be simply referred to as the "loudness of the white noise"). Then, the control unit 101 calculates a ratio of the magnitudes of the white noise sounds output from the respective speakers 23. Here, the control unit 101 calculates the ratio of the magnitudes of the white noise sounds output from the plurality of speakers 23 belonging to each group.

The control unit 101 designates the calculated ratio of the loudness of the white noise as the mixing ratio. Then, the control unit 101 stores the ratio information indicating the designated mixing ratio in the ratio information DB 103. The ratio information DB 103 has a function of storing ratio information. The ratio-information DB 103 can be realized by the auxiliary storage unit 130 in the in-vehicle device 100. FIG. 4 is a diagram illustrating an exemplary table configuration of the ratio information held in the ratio information DB 103.

Figures 4, 5:
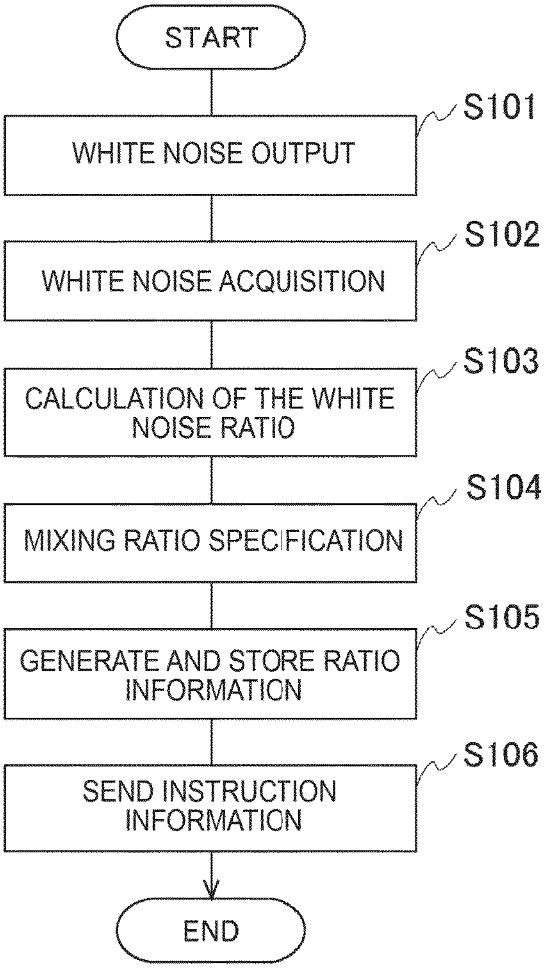
FIG. 4 is a diagram illustrating an example of a table configuration of the ratio information held in the ratio information database.
FIG. 5 is a flow chart of a first process executed by a control unit of the in-vehicle device.

As illustrated in FIG. 4, the ratio data includes a group ID field, a speaker ID field, and a ratio field. In the group ID field, an identifier (group ID) for specifying a group to which the speakers 23 belong is stored. An identifier (speaker ID) for specifying the speaker 23 is stored in the speaker ID field. Here, when a plurality of speakers belongs to one group, a plurality of speaker ID are stored in a group ID field corresponding to one group ID.

In the ratio field, the mixing ratio (ratio of the loudness of the white noise) calculated by the control unit 101 is stored. Here, the mixing ratio for each speaker 23 belonging to one group is normalized such that the sum of the mixing ratios of the plurality of speakers 23 is one. That is, the mixing ratio stored in the plurality of ratio fields corresponding to one group is one when all of the mixing ratios are added together.

The control unit 101 refers to the ratio information and transmits, to the audio device 200, instruction information instructing to perform mixing at the ratio of the respective speakers 23 belonging to the respective groups. That is, the control unit 101 transmits, to the audio device 200, instruction information indicating a mixing ratio for the plurality of speakers 23 belonging to each group. Upon receiving the instruction information, the audio device 200 performs mixing at a mixing ratio for each group. Specifically, the control unit 101 transmits instruction data via I/F of each other. Then, the audio device 200 instructs the mixer 24 to mix the output signals at a specified mixing ratio for each group. As a result, the audio device 200 mixes the output signals, and the in-vehicle device 100 can receive the reference signals.

The control unit 101 determines whether or not the user of the vehicle 10 has made an utterance. When the user of the vehicle 10 makes an utterance, the control unit 101 performs speech recognition in order to specify the utterance content of the user. At this time, the control unit 101 acquires a reference signal about the sound output from the speaker 23. Then, the control unit 101 causes the canceller 13 to cancel the sound output from the speaker 23 from the sound acquired by the microphone 12. Here, canceling the sound output from the speaker 23 from the sound acquired by the microphone 12 (hereinafter, sometimes referred to as "input sound") includes canceling the sound output from the speaker 23 from the input sound as noise. In addition, canceling the sound output from the speaker 23 from the input sound includes canceling the echo of the sound output from the speaker 23 from the input sound.

At this time, the reference signal acquired by the control unit 101 is a reference signal at the time of utterance (period) of the user of the vehicle 10. That is, the control unit 101 acquires reference information about the sound output by the plurality of speakers 23 at the time of utterance of the user of the vehicle 10. The control unit 101 causes the canceller 13 to cancel the sound generated by the plurality of speakers 23 from the input sound including the utterance of the user. At this time, the control unit 101 may appropriately amplify or process the reference signal, and then cancel the sound generated by the plurality of speakers 23. Note that a known method can be adopted as a method for the control unit 101 to cancel the sound using the reference signal. For example, the control unit 101 may cancel the sound output by the plurality of speakers 23 by superimposing the sound having the phase opposite to the phase indicated by the reference signal.

First Process

A first process executed by the control unit 101 in the in-vehicle device 100 in the speech recognition system 1 will be described with reference to FIG. 5. FIG. 5 is a flowchart of a first process executed by the control unit 101. The first process illustrated in FIG. 5 is a process for causing the speaker 23 to output white noise, determining a mixing ratio, and instructing the audio device 200.

In the first process, first, in S101, an audio signal that causes the source device 11 to output white noise is output to the audio device 200. Next, in S102, white noise is acquired using the microphone 12. Next, in S103, the loudness of the white noise of the speakers 23 belonging to one group is designated as the mixing ratio. Next, in S105, ratio information indicating the specified mixing ratio is generated and stored in the ratio information DB 103. Next, in S106, the indication is transmitted to the audio device 200. Then, the first process is ended.

Second Process

Figure 6:
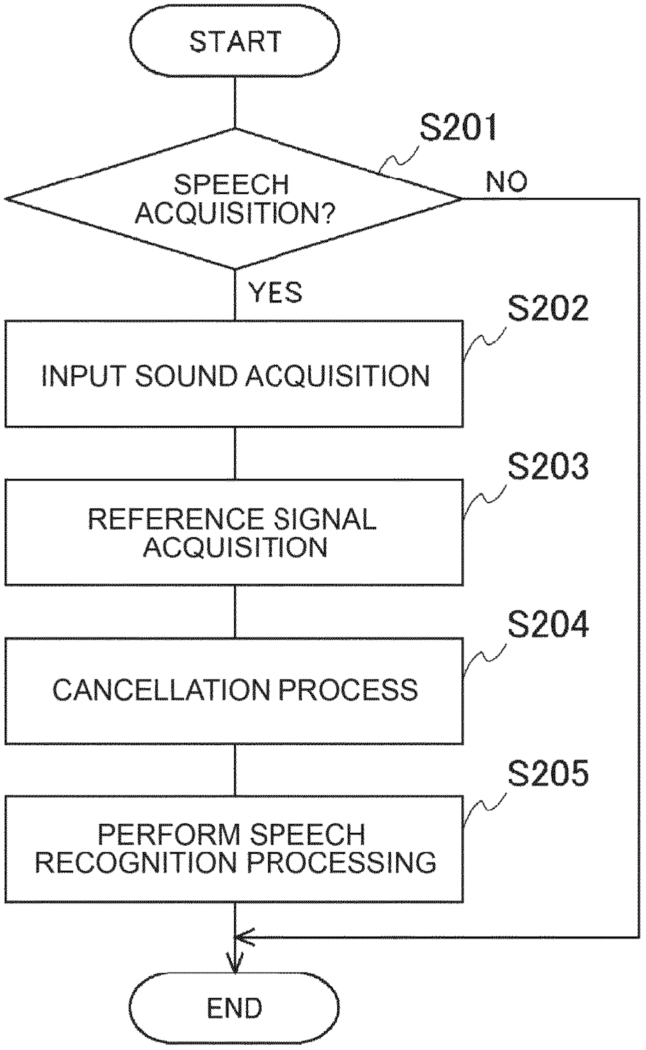
FIG. 6 is a flowchart of a second process executed by a control unit of the in-vehicle device.

Next, a second process executed by the control unit 101 in the in-vehicle device 100 in the speech recognition system 1 will be described with reference to FIG. 6. FIG. 6 is a flowchart of a second process executed by the control unit 101. The second process illustrated in FIG. 6 is a process for performing speech recognition on the utterance of the user of the vehicle 10. The second process illustrated in FIG. 6 is repeatedly executed at predetermined intervals. Thus, the second process can perform the speech recognition in real time for the utterance of the user of the vehicle 10. Note that the second process is started after the first process is executed.

In the second process, first, in S201, it is determined whether or not the user's utterance of the vehicle 10 has been acquired by the microphone 12. When a negative determination is made in S201, the user of the vehicle 10 is not speaking. Therefore, since it is not necessary to perform speech recognition, the second processing is temporarily ended.

If an affirmative determination is made in S201, an incoming sound is obtained in S202. Next, in S203, a reference-signal is obtained. Then, in S204, a cancellation process for canceling the sound outputted from the speaker 23 from the inputted sound is performed. Here, in S203, the control unit 101 acquires the reference signal at the time point (duration) when the user of the vehicle 10 speaks out of the reference signal received from the audio device 200. Since the cancellation processing is performed using the acquired reference signal, it is possible to cancel the sound output from the speaker 23 when the user of the vehicle 10 is speaking.

Next, in S205, a speech recognition process is performed on the sound that has been subjected to the cancellation process. As a result, it is possible to perform voice recognition by the sound in a state in which the sounds output from the plurality of speakers 23 are cancelled out from the sound including the utterance of the user of the vehicle 10 and the sound output from the plurality of speakers 23, which is acquired by the microphone 12.

As described above, the mixing ratio is specified in the speech recognition system 1. As a result, mixing is performed according to the loudness of the sounds output from the plurality of speakers 23, and a reference signal is generated. Then, the sounds output from the plurality of speakers 23 are cancelled out from the sounds acquired from the canceller 13 by using the reference signal. In this way, it is possible to effectively cancel out a plurality of sounds output from a plurality of speakers.

First Modification

In the present embodiment, the in-vehicle device 100 and the audio device 200 are provided in the vehicle 10. However, a device similar to the in-vehicle device 100 and the audio device 200 may be provided at a location other than the vehicle 10. For example, a device similar to the in-vehicle device 100 and the audio device 200 may be provided at an arbitrary location such as an indoor or an outdoor location. Even in such a case, the present embodiment can be applied.

Second Modification

In the present embodiment, the output signals are mixed with a plurality of speakers 23 provided within a predetermined distance from each other as one group. However, in the present modification, all the output signals to all the speakers 23 in the vehicle 10 may be mixed and output to the in-vehicle device 100 as one reference signal. In this way, the in-vehicle device 100 can perform cancellation processing using one reference signal without acquiring a plurality of reference signals. As a result, the processing load of the in-vehicle device 100 (canceller 13) can be reduced. Even in this manner, a plurality of sounds output from the plurality of speakers 23 can be effectively cancelled out.

Third Modification

The mixer 24 may be provided in the in-vehicle device 100. In this case, the microcomputer 21 in the audio device 200 outputs an output signal to the mixer 24 provided in the in-vehicle device 100. Then, the mixer 24 mixes the output signal and outputs the reference signal to the canceller 13. This makes it possible to cancel the sounds output from the plurality of speakers 23 in a state where the number of reference signals processed by the canceller 13 is reduced. As a result, by reducing the processing load of the in-vehicle device 100 (canceller 13), it is possible to effectively cancel out a plurality of sounds output from the plurality of speakers 23.

Fourth Modification

The first process illustrated in FIG. 5 may be executed when an input for starting execution is performed on the in-vehicle device 100. That is, a configuration may be adopted in which a designer who designs a model of the vehicle 10 or a user of the vehicle 10 can execute the first process before manufacturing the vehicle 10. It is assumed that the designer executes the first process. In this case, the designer executes the first process at the time of designing the model of the vehicle 10 before manufacturing the vehicle 10. Then, by setting the calculated mixing ratio to the audio device 200 in advance, it is not necessary to execute the first process again in the same model as the vehicle 10 having the same interior or the like. Here, setting the calculated mixing ratio in advance with respect to the audio device 200 includes causing the ratio information indicating the calculated mixing ratio to be held in advance in the ratio information DB 103, and causing the audio device 200 to transmit the instruction information. Also, presetting the calculated mixing ratio for the audio device 200 includes the designer specifying the calculated mixing ratio directly for the audio device 200 (mixer 24) in advance.

Further, it is assumed that the user of the vehicle 10 executes the first process. In this case, the user of the vehicle 10 may execute the first process when the interior or the like of the vehicle 10 is changed. Here, the change of the interior or the like of the vehicle 10 is, for example, a change of a material, a shape, or the like of a seat or an interior of the vehicle 10. When the speaker 23 outputs a sound by changing a material or a shape, such as a seat or a lining, in the vehicle 10, the state of reflection of the sound in the vehicle 10 is different. Then, it is assumed that the sound acquired by the in-vehicle device 100 changes. Further, the change of the interior of the vehicle 10 or the like may be a change of the speaker 23. It is assumed that the sound acquired by the in-vehicle device 100 is changed by changing the model, the manufacturer, or the like of the speaker 23. When the user of the vehicle 10 causes the in-vehicle device 100 to execute the first process at an arbitrary timing, it is possible to effectively cancel out the plurality of sounds output from the plurality of speakers 23 even when the sound acquired by the in-vehicle device 100 changes.

Fifth Modification

In the present embodiment, the microphone 12 is provided in the in-vehicle device 100. That is, the microphone 12 is directly connected to the control unit 101. However, the connection mode between the microphone 12 and the control unit 101 is not limited to such an example. In another example, the control unit 101 may be indirectly connected to the microphone 12 via one or more computers such as a relay device.

Other Embodiments

The above-described embodiments are mere examples, and the present disclosure can be implemented with appropriate modifications within a range not departing from the scope thereof. Moreover, the processes and units described in the present disclosure can be freely combined and implemented unless technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc read-only memory (CD-ROM), digital versatile disc (DVD), Blu-ray disc, etc.), a read only memory (ROM), a random access memory (RAM), an erasable programmable read only memory (EPROM), an electrically erasable programmable read only memory (EEPROM), a magnetic card, a flash memory, or any type of medium suitable for storing electronic commands such as an optical card.

What is claimed is:

1. An information processing device comprising a control unit configured to:

acquire a plurality of first sounds output from a plurality of speakers;

calculate proportions of magnitudes of the acquired first sounds; and set mixing proportions by applying the calculated proportions of the magnitudes of the first sounds as the mixing proportions, the mixing proportions being proportions for mixing a plurality of sound signals and being used to generate a reference signal for canceling out a plurality of output sounds output from the speakers according to the sound signals from a sound acquired from a microphone.

2. The information processing device according to claim 1, wherein the control unit is further configured to output the set mixing proportions.

3. The information processing device according to claim 2, wherein outputting of the mixing proportions includes instructing a mixer to perform mixing at the mixing proportions.

4. The information processing device according to claim 1, wherein the speakers are provided within a predetermined distance from each other.

5. The information processing device according to claim 1, wherein the control unit is further configured to:

acquire an input sound including a plurality of second sounds output from the speakers via the microphone;

acquire, as the reference signal, a signal obtained by mixing a plurality of signals for outputting the second sounds at the mixing proportions; and cancel out the second sounds from the input sound using the acquired reference signal.

* * * * *